United States Patent
Xiong et al.

(10) Patent No.: US 10,236,960 B2
(45) Date of Patent: Mar. 19, 2019

(54) TERMINAL HAVING COMMUNICATION FUNCTION

(71) Applicant: Xiaomi Inc., Beijing (CN)

(72) Inventors: Xiaofeng Xiong, Beijing (CN); Zonglin Xue, Beijing (CN); Linchuan Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 128 days.

(21) Appl. No.: 15/370,376

(22) Filed: Dec. 6, 2016

(65) Prior Publication Data

US 2017/0163323 A1  Jun. 8, 2017

(30) Foreign Application Priority Data

Dec. 7, 2015  (CN) .......................... 2015 1 0892154

(51) Int. Cl.
  *H01Q 5/50* (2015.01)
  *H04B 7/06* (2006.01)
  (Continued)

(52) U.S. Cl.
  CPC ............. *H04B 7/061* (2013.01); *H01Q 1/243* (2013.01); *H01Q 3/24* (2013.01); *H01Q 5/50* (2015.01);
  (Continued)

(58) Field of Classification Search
  CPC ........ H04B 7/061; H04B 1/3838; H04B 1/40; H04B 7/0608; H01Q 5/50; H01Q 1/243; H01Q 21/28; H01Q 3/24
  (Continued)

(56) References Cited

U.S. PATENT DOCUMENTS 8,159,399 B2 * 4/2012 Dorsey ................ H01Q 1/2266
              343/702
2005/0277387 A1  12/2005 Kojima et al.
(Continued)

FOREIGN PATENT DOCUMENTS

CN    101729111 A    6/2010
CN    103414507 A    11/2013
(Continued)

OTHER PUBLICATIONS

Partial Search Report for European Application No. 16201716.4 from the European Patent Office, dated May 18, 2017.
(Continued)

*Primary Examiner* — Hai V Tran
(74) *Attorney, Agent, or Firm* — Finnegan, Henderson, Farabow, Garrett & Dunner LLP

(57) ABSTRACT

A terminal having a communication function includes: a first multiband antenna; a second multiband antenna; a radio frequency transceiver including a primary carrier wave port and a secondary carrier wave port; and a switching control circuit electrically connected with the primary carrier wave port, the secondary carrier wave port, the first multiband antenna, and the second multiband antenna. The switching control circuit is configured to connect the primary carrier wave port with the first multiband antenna and connect the secondary carrier wave port with the second multiband antenna if signal quality of the first multiband antenna meets a preset quality condition, and connect the primary carrier wave port with the second multiband antenna and connect the secondary carrier wave port with the first multiband antenna if the signal quality of the first multiband antenna does not meet the preset quality condition.

10 Claims, 3 Drawing Sheets

(51) Int. Cl.
    *H01Q 1/24*     (2006.01)
    *H04B 1/40*     (2015.01)
    *H04B 7/08*     (2006.01)
    *H04W 52/02*     (2009.01)
    *H01Q 3/24*     (2006.01)
    *H01Q 21/28*     (2006.01)
    *H04B 1/10*     (2006.01)
    *H04W 88/02*     (2009.01)
    *H04B 17/309*     (2015.01)

(52) U.S. Cl.
    CPC ............... *H01Q 21/28* (2013.01); *H04B 1/40* (2013.01); *H04B 7/0608* (2013.01); *H04B 7/0814* (2013.01); *H04W 52/0245* (2013.01); *H04B 1/1027* (2013.01); *H04B 17/309* (2015.01); *H04W 88/02* (2013.01); *Y02D 70/26* (2018.01); *Y02D 70/40* (2018.01); *Y02D 70/444* (2018.01)

(58) Field of Classification Search
    USPC .......................................... 343/702, 700 MS
    See application file for complete search history.

(56) References Cited

U.S. PATENT DOCUMENTS

2012/0282982 A1    11/2012    Mujtaba et al.
2014/0361947 A1*  12/2014  Haridas .................. H01Q 1/243
                                                   343/848
2015/0188599 A1    7/2015    Shi et al.
2015/0234077 A1*  8/2015   Komulainen ............ G01V 3/12
                                                   324/629

FOREIGN PATENT DOCUMENTS

| CN | 104601195 A | 5/2015 |
|---|---|---|
| CN | 105390801 A | 3/2016 |
| JP | 2004254098 A | 9/2004 |
| JP | 2012105124 A | 5/2012 |
| JP | 2015-061110 A | 3/2015 |
| JP | 2015507861 A | 3/2015 |
| RU | 2 452 090 C2 | 8/2010 |
| SU | 502510 A1 | 2/1976 |
| WO | WO 2004/032283 A1 | 4/2004 |

OTHER PUBLICATIONS

English version of International Search Report of PCT Application No. PCT/CN2016/100991, dated Jan. 4, 2017, issued by the ISA/CN—State Intellectual Property Office of the P.R. China.
International Search Report in counterpart International Application No. PCT/CN2016/100991 dated Jan. 4, 2017.
Office Action in counterpart Russian Application No. 2016150572/07(081121), dated Feb. 28, 2018.

* cited by examiner

TERMINAL HAVING COMMUNICATION FUNCTION

CROSS-REFERENCE TO RELATED APPLICATIONS

The present application is based upon and claims priority to Chinese Patent Application No. 201510892154.0, filed Dec. 7, 2015, the entire contents of which are incorporated herein by reference.

TECHNICAL FIELD

The present disclosure generally relates to the communication technical field, and more particularly, to a terminal having a communication function.

BACKGROUND

With advancements of communication technologies, terminals, such as mobile phones, have more and more functions and become one of the necessary parts in our daily life. People can use terminals to chat with friends or family, buy things online, and watch video programs and the like. All these functions are associated with antennas disposed in the terminals. An antenna of a terminal is generally disposed within the terminal, for example, at the bottom of the terminal, to enable the terminal to transmit data.

If a user inadvertently holds a portion of the terminal where the antenna is disposed, an electrical impedance (e.g., a resistance) of the antenna will be changed. Thus, the resonance frequency of the antenna will deviate, and thereby the quality for data transmission will be affected.

SUMMARY

According to one aspect of the present disclosure, there is provided a terminal having a communication function. The terminal includes: a first multiband antenna; a second multiband antenna; a radio frequency transceiver including a primary carrier wave port and a secondary carrier wave port; and a switching control circuit electrically connected with the primary carrier wave port, the secondary carrier wave port, the first multiband antenna, and the second multiband antenna. The switching control circuit is configured to connect the primary carrier wave port with the first multiband antenna and connect the secondary carrier wave port with the second multiband antenna if signal quality of the first multiband antenna meets a preset quality condition, and connect the primary carrier wave port with the second multiband antenna and connect the secondary carrier wave port with the first multiband antenna if the signal quality of the first multiband antenna does not meet the preset quality condition.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Figure 1:
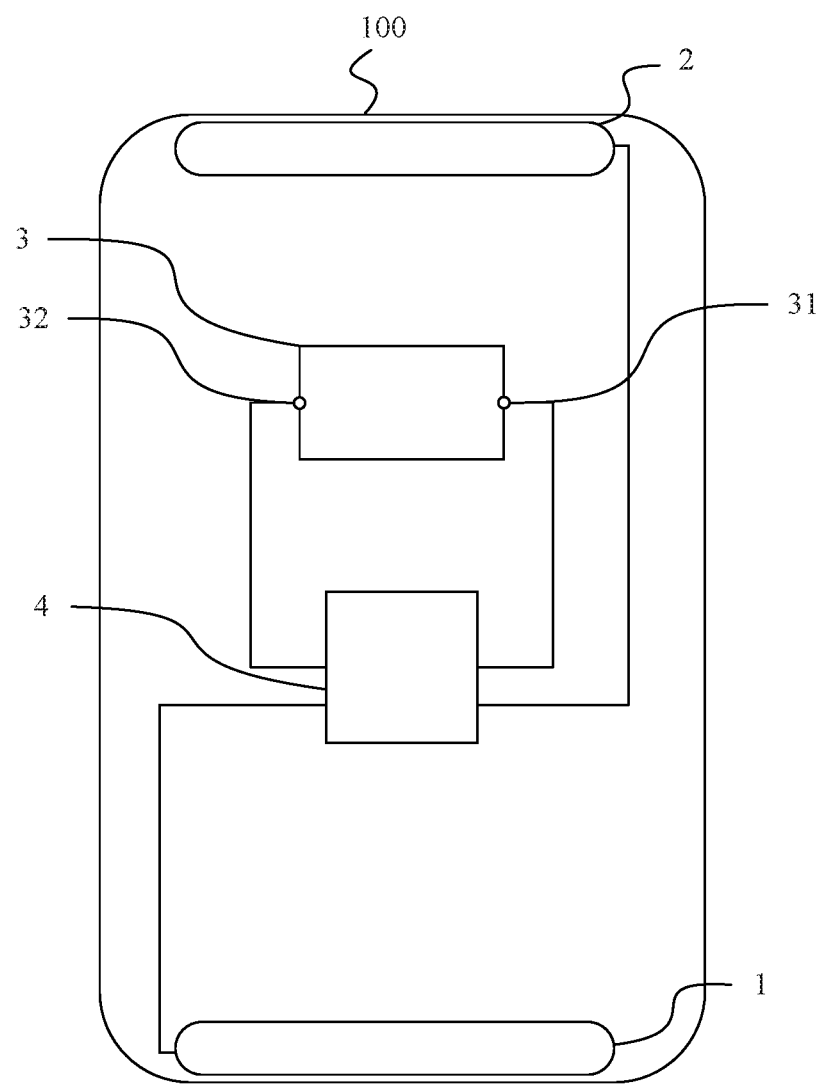
FIG. 1 is a schematic diagram of a terminal having a communication function according to an exemplary embodiment.

Below is a list of the labels and their corresponding components, respectively, shown in the drawings.

| | |
|---|---|
| 1 first multiband antenna | 2 second multiband antenna |
| 3 radio frequency transceiver | 4 switching control circuit |
| 31 primary carrier wave port | 32 secondary carrier wave port |
| 41 controller | 42 first electrically controllable selection switch |
| 43 second electrically controllable selection switch | 44 impedance adjustment circuit |
| 421 control signal terminal | 431 control signal terminal |
| 441 impedance adjustment branch | 442 control signal terminal |
| 443 control switch | |

Exemplary embodiments of the present disclosure are shown in the above drawings, and detailed description will be provided later. These drawings and detailed descriptions are not intended to restrict the scope of the present disclosure in any way, but to convey the conception of the present disclosure to one of ordinary skill in this art by exemplary embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

FIG. 1 is a schematic diagram of a terminal 100 having a communication function according to an exemplary embodiment of the present disclosure. For convenience of illustration, not all parts of the terminal 100 are depicted in FIG. 1. Referring to FIG. 1, the terminal 100 includes a first multiband antenna 1, a second multiband antenna 2, a radio frequency transceiver 3, and a switching control circuit 4. The radio frequency transceiver 3 includes a primary carrier wave port 31 and a secondary carrier wave port 32. The switching control circuit 4 is electrically connected with the primary carrier wave port 31, the secondary carrier wave port 32, the first multiband antenna 1, and the second multiband antenna 2. The switching control circuit 4 is configured to connect the primary carrier wave port 31 with the first multiband antenna 1 and connect the secondary carrier wave port 32 with the second multiband antenna 2 if signal quality of the first multiband antenna 1 meets a preset quality condition, and connect the primary carrier wave port 31 with the second multiband antenna 2 and connect the secondary carrier wave port 32 with the first multiband antenna 1 if the signal quality of the first multiband antenna 1 does not meet the preset quality condition.

In the illustrated embodiment, the terminal 100 includes the first multiband antenna 1, the second multiband antenna 2, the radio frequency transceiver 3, and the switching control circuit 4, in which the first multiband antenna 1 and the second multiband antenna 2 can be used to receive and send signals. The first multiband antenna 1 and the second multiband antenna 2 can each support/bear a plurality of working frequency bands, including all frequency bands of primary carrier wave(s) and secondary carrier wave(s). The working frequency bands supported by the first and second multiband antennas 1 and 2 can be the same. The radio frequency transceiver 3 includes the primary carrier wave port 31 and the secondary carrier wave port 32. The switching control circuit 4 is electrically connected with the primary carrier wave port 31, the secondary carrier wave port 32, the first multiband antenna 1, and the second multiband antenna 2.

In exemplary embodiments, a preset quality condition of the first multiband antenna 1, for example, a threshold of a signal strength, can be pre-stored in the terminal. If an actual signal quality of the first multiband antenna 1 meets the preset quality condition, the first multiband antenna 1 can conduct communication normally.

In exemplary embodiments, after obtaining the signal quality of the first multiband antenna 1, the switching control circuit 4 can obtain the pre-stored preset quality condition, compare the signal quality of the first multiband antenna 1 with the preset quality condition. If the signal quality of the first multiband antenna 1 meets the preset quality condition, the switching control circuit 4 connects the first multiband antenna 1 with the primary carrier wave port 31, and connects the second multiband antenna 2 with the secondary carrier wave port 32. If the signal quality of the first multiband antenna 1 does not meet the preset quality condition because, for example, the user inadvertently holds a portion of the terminal where the first multiband antenna 1 is disposed, thereby resulting in an offset (or deviation) of resonance frequency of the first multiband antenna 1, the switching control circuit 4 connects the primary carrier wave port 31 with the second multiband antenna 2, and connects the secondary carrier wave port 32 with the first multiband antenna 1. In this way, when the signal quality of the first multiband antenna 1 is poor, the second multiband antenna 2 can be used to conduct communication. Thus, the communication quality of the terminal may be guaranteed.

According to an embodiment, the signal quality meets the preset quality condition when the signal strength is equal to or greater than a preset threshold. The signal quality does not meet the preset quality condition when the signal strength is smaller than the preset threshold.

In the illustrated embodiment, if the signal strength is equal to or greater than the preset threshold, it can be determined that the signal quality meets the preset quality condition. If the signal strength of the first multiband antenna 1 is equal to or greater than the preset threshold, the first multiband antenna 1 can receive and send signals normally. If the signal strength is smaller than the preset threshold, it can be determined that the signal quality does not meet the preset quality condition, that is, the signal strength is lower than the preset threshold. If the signal strength of the first multiband antenna 1 is smaller than the preset threshold, the first multiband antenna 1 may not receive and send signals normally.

According to an embodiment, as shown in FIG. 1, the first multiband antenna 1 and the second multiband antenna 2 can be disposed respectively at two different ends within the terminal 100.

In the illustrated embodiment, the first multiband antenna 1 and the second multiband antenna 2 can be disposed at two different ends within the terminal 100, for example, at the upper end and lower end of the terminal 100. For example, the first multiband antenna 1 can be disposed at the lower end of the terminal 100, and the second multiband antenna 2 can be disposed at the upper end of the terminal 100. In this way, the first multiband antenna 1 and the second multiband antenna 2 are disposed at two ends of the terminal 100 so that they are distant from each other. Thus, it is unlikely that the two antennas interfere with each other. That is, the possibility that the first multiband antenna 1 and the second multiband antenna 2 interfere with each other can be reduced.

According to an embodiment, the first multiband antenna 1 and the second multiband antenna 2 are ultra-wideband antennas.

In the embodiment, the first multiband antenna 1 and the second multiband antenna 2 may be ultra-wideband antennas. The first multiband antenna 1 and the second multiband antenna 2 can each support a plurality of working frequency bands, including all frequency bands of primary carrier wave(s) and secondary carrier wave(s). The working frequency bands supported by the first and second multiband antennas 1 and 2 can be the same. Thus, the first multiband antenna 1 and the second multiband antenna 2 can support a plurality of working frequency bands, so that the number of the antennas can be reduced.

Figure 2:
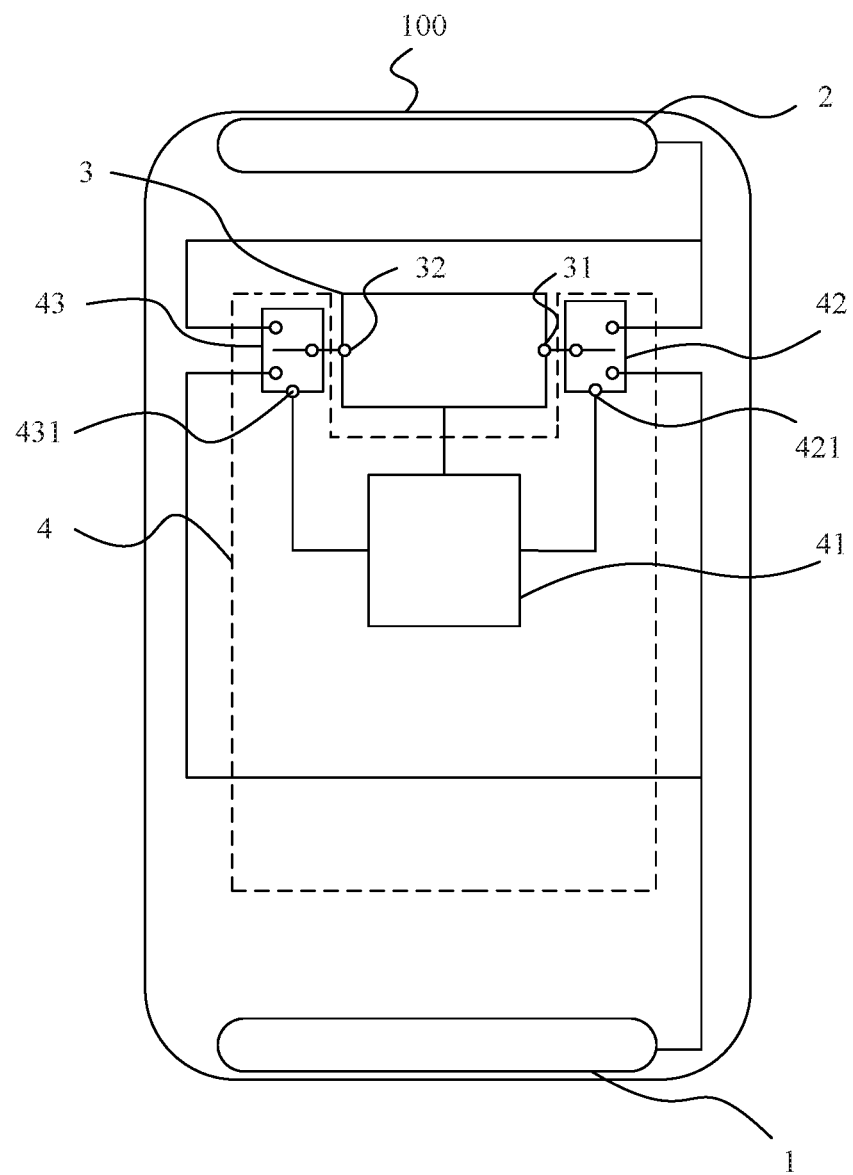
FIG. 2 is a schematic diagram of a terminal having a communication function according to an exemplary embodiment.

According to an embodiment, as shown in FIG. 2, the switching control circuit 4 includes a controller 41, a first electrically-controllable selection switch 42, and a second electrically-controllable selection switch 43. A first control signal terminal 421 of the first electrically controllable selection switch 42 and a second control signal terminal 431 of the second electrically controllable selection switch 43 are electrically connected with the controller 41. The controller 41 is electrically connected with the radio frequency transceiver 3. The first electrically-controllable selection switch 42 is electrically connected with the primary carrier wave port 31, the first multiband antenna 1, and the second multiband antenna 2. The second electrically-controllable selection switch 43 is electrically connected with the secondary carrier wave port 32, the first multiband antenna 1, and the second multiband antenna 2. In this way, switching between the first multiband antenna 1 and the second multiband antenna 2 which are connected with the primary carrier wave port 31 and the secondary carrier wave port 32, respectively, can be realized.

In the embodiment, the switching control circuit 4 includes the controller 41, the first electrically-controllable selection switch 42, and the second electrically-controllable selection switch 43. The first electrically-controllable selection switch 42 and the second electrically-controllable selection switch 43 are provided with the first control signal terminal 421 and the second control signal terminal 431, respectively. The first control signal terminal 421 of the first electrically-controllable selection switch 42 and the second control signal terminal 431 of the second electrically-controllable selection switch 43 are electrically connected with the controller 41. The controller 41 is electrically connected with the radio frequency transceiver 3. The first electrically-controllable selection switch 42 is electrically connected with the primary carrier wave port 31, the first multiband antenna 1, and the second multiband antenna 2. The first electrically-controllable selection switch 42 allows the primary carrier wave port 31 to be connected with the first multiband antenna 1 or the second multiband antenna 2. The second electrically-controllable selection switch 43 is electrically connected with the secondary carrier wave port 32, the first multiband antenna 1, and the second multiband antenna 2. The second electrically-controllable selection switch 43 allows the secondary carrier wave port 32 to be electrically connected with the first multiband antenna 1 or the second multiband antenna 2.

According to an embodiment, the controller 41 is configured to: obtain the signal quality of the first multiband antenna 1 detected by the radio frequency transceiver 3; and if the signal quality of the first multiband antenna 1 meets the preset quality condition, control the first electrically-controllable selection switch 42 to connect the primary carrier wave port 31 with the first multiband antenna 1 and control the second electrically-controllable selection switch 43 to connect the secondary carrier wave port 32 with the second multiband antenna 2; and if the signal quality of the first multiband antenna 1 does not meet the preset quality condition, control the first electrically-controllable selection switch 42 to connect the primary carrier wave port 31 with the second multiband antenna 2 and control the second electrically-controllable selection switch 43 to connect the secondary carrier wave port 32 with the first multiband antenna 1.

In the embodiment, the radio frequency transceiver 3 detects the signal quality of the first multiband antenna 1. The controller 41 obtains the signal quality of the first multiband antenna 1 from the radio frequency transceiver 3, obtains the pre-stored preset quality condition and compares the signal quality of the first multiband antenna 1 with the preset quality condition. If the signal quality of the first multiband antenna 1 meets the present quality condition, the controller 41 controls the first electrically-controllable selection switch 42 to connect the primary carrier wave port 31 with the first multiband antenna 1 and controls the second electrically-controllable selection switch 43 to connect the secondary carrier wave port 32 with the second multiband antenna 2. If the signal quality of the first multiband antenna 1 does not meet the preset quality condition, the controller 41 controls the first electrically-controllable selection switch 42 to connect the primary carrier wave port 31 with the second multiband antenna 2, such that the working frequency band of the second multiband antenna 2 corresponds to the primary carrier wave under such condition, and controls the second electrically-controllable selection switch 43 to connect the secondary carrier wave port 32 with the first multiband antenna 1, such that the working frequency band of the first multiband antenna 1 corresponds to the secondary carrier wave under such condition. In this way, if the signal quality of the first multiband antenna 1 does not meet the preset quality condition, the controller 41 can connect the primary carrier wave port 31 with the second multiband antenna 2 so that the communication quality of the terminal may be guaranteed.

According to an embodiment, the switching control circuit 4 is further configured to: if the signal quality of the first multiband antenna 1 does not meet the preset quality condition and signal quality of the second multiband antenna 2 meets the preset quality condition, connect the primary carrier wave port 31 with the second multiband antenna 2 and connect the secondary carrier wave port 32 with the first multiband antenna 1.

The switching control circuit 4 is further configured to: if the signal quality of the first multiband antenna 1 does not meet the preset quality condition and the signal quality of the second multiband antenna 2 does not meet the preset quality, connect the primary carrier wave port 31 with the first multiband antenna 1 and connect the secondary carrier wave port 32 with the second multiband antenna 2.

In the embodiment, if the switching control circuit 4 determines that the current signal quality of the first multiband antenna 1 does not meet the preset quality condition, the switching control circuit 4 obtains the signal quality of the second multiband antenna 2 and compares the signal quality of the second multiband antenna 2 with the present quality condition. If it is determined that the current signal quality of the second multiband antenna 2 meets the preset signal quality, the switching control circuit 4 connects the primary carrier wave port 31 with the second multiband antenna 2 such that the working frequency band of the second multiband antenna 2 corresponds to the primary carrier wave under such condition and connects the secondary carrier wave port 32 with the first multiband antenna 1 such that the working frequency band of the first multiband antenna 1 corresponds to the secondary carrier wave under such condition. Thus, the communication quality of the terminal may be guaranteed.

If the switching control circuit 4 determines that the current signal quality of the first multiband antenna 1 does not meet the preset quality condition, the switching control circuit 4 obtains the signal quality of the second multiband antenna 2 and compares the signal quality of the second multiband antenna 2 with the preset quality condition. If it is determined that the signal quality of the second multiband antenna 2 does not meet the preset signal quality, the switching control circuit 4 connects the primary carrier wave port 31 with the first multiband antenna 1, such that the working frequency band of the first multiband antenna 1 corresponds to the primary carrier wave under such condition, and connects the secondary carrier wave port 32 with the second multiband antenna 2, such that the working frequency band of the second multiband antenna 2 corresponds to the secondary carrier wave under such condition.

According to an embodiment, the controller 41 is a baseband controller.

Figure 3:
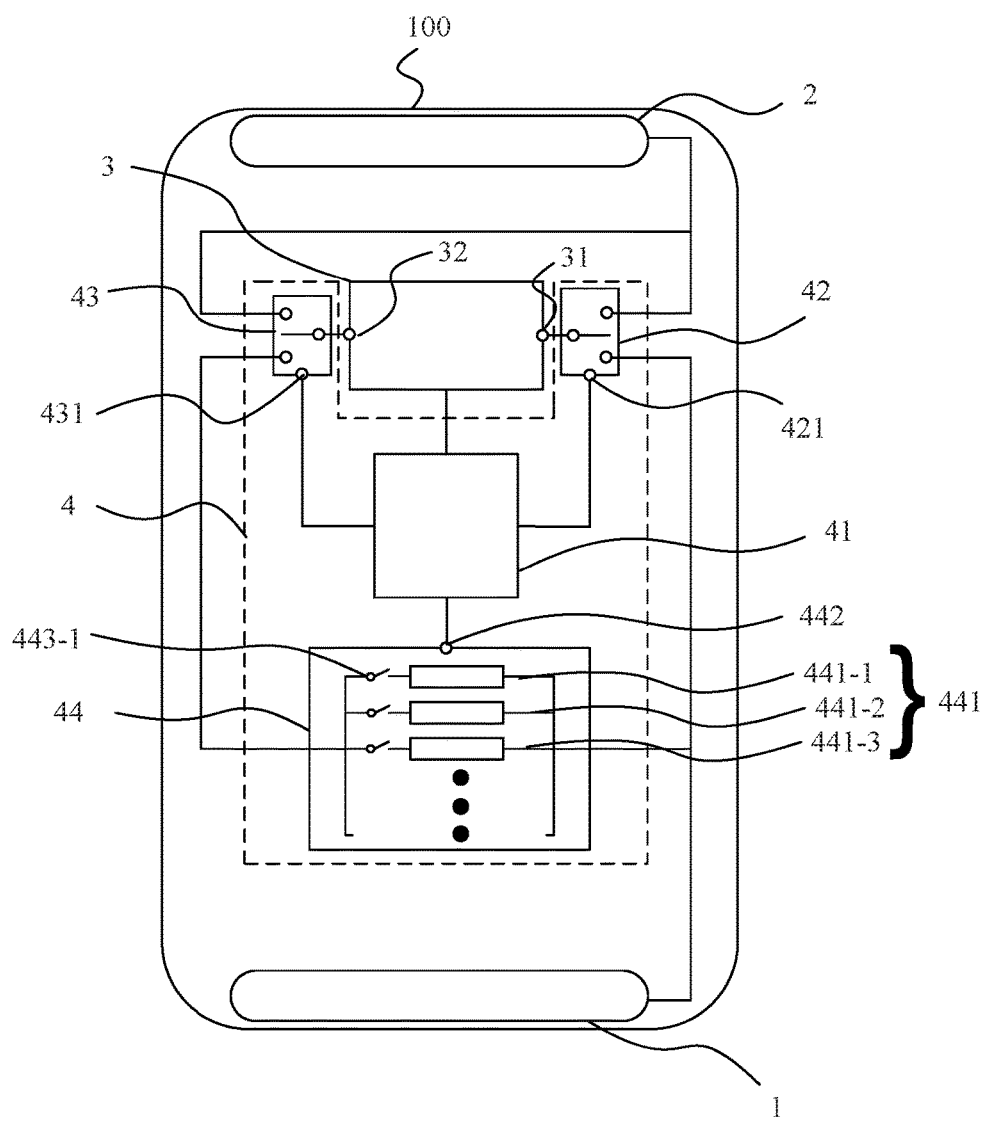
FIG. 3 is a schematic diagram of a terminal having a communication function according to an exemplary embodiment.

According to an embodiment, the terminal 100 further includes a impedance adjustment circuit 44. As shown in FIG. 3, the impedance adjustment circuit 44 is disposed on a connection line for connecting the second electrically-controllable selection switch 43 and the first multiband antenna 1. The impedance adjustment circuit 44 includes a plurality of impedance adjustment branches 441-1, 441-2, 441-3, etc. (collectively impedance adjustment branches 441), which are connected in parallel. The impedance adjustment circuit 44 further includes a control signal terminal 442 electrically-connected with the baseband controller 41.

In the embodiment, the switching control circuit 4 further includes the impedance adjustment circuit 44 which is disposed on a connection line for connecting the second electrically-controllable selection switch 43 and the first multiband antenna 1. The impedance adjustment circuit 44 is configured to adjust the resonance frequency of the first multiband antenna 1 into the resonance frequency before deviation. In some embodiments, the resonance frequency before deviation is a preset electrical impedance of the first multiband antenna 1. In one exemplary embodiment, the impedance adjustment circuit 44 includes a plurality of impedance adjustment branches 441 which are connected in parallel. Each of the plurality of impedance adjustment branches 441 can be provided with a control switch which is used for turning on or off a corresponding impedance adjustment branch 441. For example, the first impedance adjustment branch 441-1 can be provided with a first control switch 443-1. If the first control switch 443-1 is in a closed state, the first impedance adjustment branch 441-1 can be in a conductive state. The impedance adjustment circuit 44 is further provided with a control signal terminal 442 which is electrically connected with the baseband controller 41.

According to an embodiment, the controller 41 is further configured to: if it is determined that the signal quality of the first multiband antenna 1 does not meet the preset quality condition, obtain a resonance frequency offset of a currently used secondary carrier which is detected by the radio frequency transceiver 3; according to pre-stored corresponding relationships between resonance frequency offsets and impedance adjustment branches 441, determine, for example, a first impedance adjustment branch 441-1 corresponding to the resonance frequency offset of the currently-used secondary carrier; and control the impedance adjustment circuit 44 to turn on the first impedance adjustment branch 441-1 and turn off other impedance adjustment branches 441.

In an embodiment, the corresponding relationships between resonance frequency offsets and impedance adjustment branches 441 are pre-stored. For example, the corresponding relationships can be corresponding relationships between resonance frequency offsets and identification numbers (e.g., indexes) of the impedance adjustment branches 441, respectively. If the signal quality of the first multiband antenna 1 does not meet the preset quality condition, the controller 41 controls the first electrically-controllable selection switch 42 to connect the primary carrier wave port 31 with the second multiband antenna 2, and controls the second electrically-controllable selection switch 43 to connect the secondary carrier wave port 32 with the first multiband antenna 1. The controller 41 can obtain the currently used frequency band of the secondary carrier, and send a request for obtaining the resonance frequency offset of the first multiband antenna 1 to the radio frequency transceiver 3. After receiving the request, the radio frequency transceiver 3 can determine the current resonance frequency offset of the first multiband antenna 1, and send the resonance frequency offset to the controller 41. After receiving the resonance frequency offset, the controller 41 can obtain the pre-stored corresponding relationships between resonance frequency offsets and identification numbers of impedance adjustment branches 441, and determine, according to the obtained resonance frequency offset, a first impedance adjustment branch 441 corresponding to the resonance frequency offset. The controller 41 sends a control instruction to the impedance adjustment circuit 44, and the control instruction includes the identification number of the first impedance adjustment branch 441. After receiving the control instruction, the impedance adjustment circuit 44 parses the control instruction to obtain the identification number of the first impedance adjustment branch 441, turns on the first impedance adjustment branch 441, and turns off other impedance adjustment branches 441 in the impedance adjustment circuit 44. Thus, the first impedance adjustment branch 441 can adjust the resonance frequency of the first multiband antenna 1 into the resonance frequency before deviation. The terminal 100 can use the currently-used primary carrier wave and secondary carrier wave to realize outbound carrier aggregation, and thereby the data transmission efficiency of the terminal 100 can be improved.

If the signal quality of the first multiband antenna 1 does not meet the preset quality condition, the radio frequency transceiver 3 can detect that the resonance frequency of the first multiband antenna 1 deviates from a preset value, i.e., a resonance frequency offset. The radio frequency transceiver 3 can send a notification to the controller 41 to notify the resonance frequency deviation or resonance frequency offset. The notification can include the current resonance frequency offset of the first multiband antenna 1. After receiving the resonance frequency offset, the controller 41 can obtain the pre-stored corresponding relationships between resonance frequency offsets and identification numbers of impedance adjust branches 441, and determine, according to the obtained resonance frequency offset, a first impedance adjustment branch 441 corresponding to the resonance frequency offset. The controller 41 sends a control instruction to the impedance adjustment circuit 44, and the control instruction includes the identification number of the first impedance adjustment branch 441-1 that can compensate for the resonance frequency offset. After receiving the control instruction, the impedance adjustment circuit 44 parses the control instruction to obtain the identification number of the first impedance adjustment branch 441, turns on the first impedance adjustment branch 441, and turns off other impedance adjustment branches 441 in the impedance adjustment circuit 44. Thus, the first impedance adjustment branch 441 can adjust the resonance frequency of the first multiband antenna 1 into the resonance frequency before deviation. The terminal 100 can use the currently-used primary carrier wave and secondary carrier wave to realize outbound carrier aggregation, and thereby the data transmission efficiency of the terminal 100 can be improved.

In the embodiments of the present disclosure, the terminal includes a first multiband antenna, a second multiband antenna, a radio frequency transceiver, and a switching control circuit. The radio frequency transceiver includes a primary carrier wave port and a secondary carrier wave port. The switching control circuit is electrically connected with the primary carrier wave port, the secondary carrier wave port, the first multiband antenna, and the second multiband antenna. The switching control circuit is configured to connect the primary carrier wave port with the first multiband antenna and connect the secondary carrier wave port with the second multiband antenna if signal quality of the first multiband antenna meets a preset quality condition, and connect the primary carrier wave port with the second multiband antenna and connect the secondary carrier wave port with the first multiband antenna if the signal quality of the first multiband does not meet the preset quality condition. That is, if the signal quality of the first multiband antenna is good, the first multiband antenna is used as the primary carrier wave antenna. If the signal quality of the first multiband antenna is poor, the terminal uses the second multiband antenna as the primary wave antenna to conduct communications. Thus, the quality of data transmission of the terminal affected by the degradation of the antenna can be reduced.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A terminal having a communication function, comprising:
   a first multiband antenna;
   a second multiband antenna;
   a radio frequency transceiver including a primary carrier wave port and a secondary carrier wave port; and
   a switching control circuit electrically connected with the primary carrier wave port, the secondary carrier wave port, the first multiband antenna, and the second multiband antenna,
   wherein the switching control circuit connects the primary carrier wave port with the first multiband antenna and connects the secondary carrier wave port with the second multiband antenna when signal quality of the first multiband antenna meets a preset quality condition, and connects the primary carrier wave port with the second multiband antenna and connects the secondary carrier wave port with the first multiband antenna when the signal quality of the first multiband antenna does not meet the preset quality condition.

2. The terminal according to claim 1, wherein the first multiband antenna and the second multiband antenna are disposed at two different ends within the terminal, respectively.

3. The terminal according to claim 1, wherein the first multiband antenna and the second multiband antenna are ultra-wideband antennas.

4. The terminal according to claim 1, wherein the switching control circuit comprises a controller, a first electrically-controllable selection switch, and a second electrically-controllable selection switch;
   wherein:
   a control signal terminal of the first electrically-controllable selection switch and a control signal terminal of the second electrically-controllable selection switch are electrically connected with the controller;
   the controller is electrically connected with the radio frequency transceiver;
   the first electrically-controllable selection switch is electrically connected with the primary carrier wave port, the first multiband antenna, and the second multiband antenna; and
   the second electrically-controllable selection switch is electrically connected with the secondary carrier wave port, the first multiband antenna, and the second multiband antenna.

5. The terminal according to claim 4, wherein the controller is configured to:
   obtain the signal quality of the first multiband antenna detected by the radio frequency transceiver;
   when the signal quality of the first multiband antenna meets the preset quality condition, control the first electrically-controllable selection switch to connect the primary carrier wave port with the first multiband antenna and control the second electrically-controllable selection switch to connect the secondary carrier wave port with the second multiband antenna, and
   when the signal quality of the first multiband antenna does not meet the preset quality condition, control the first electrically-controllable selection switch to connect the primary carrier wave port with the second multiband antenna and control the second electrically-controllable selection switch to connect the secondary carrier wave port with the first multiband antenna.

6. The terminal according to claim 4, wherein the controller is a baseband controller.

7. The terminal according to claim 6, further comprising a impedance adjustment circuit disposed on a connection line for connecting the second electrically-controllable selection switch and the first multiband antenna, the impedance adjustment circuit including a plurality of impedance adjustment branches which are connected in parallel, the impedance adjustment circuit further including a control signal terminal electrically connected with the baseband controller.

8. The terminal according to claim 7, wherein the controller is further configured to:
   when it is determined that the signal quality of the first multiband antenna does not meet the preset quality condition, obtain a resonance frequency offset of a currently-used secondary carrier which is detected by the radio frequency transceiver;
   according to pre-stored corresponding relationships between resonance frequency offsets and impedance adjustment branches, determine a first impedance adjustment branch corresponding to the resonance frequency offset of the currently-used secondary carrier; and
   control the impedance adjustment circuit to turn on the first impedance adjustment branch and turn off other impedance adjustment branches.

9. The terminal according to claim 1, wherein the switching control circuit is configured to:
   when the signal quality of the first multiband antenna does not meet the preset quality condition and signal quality of the second multiband antenna meets the preset quality condition, connect the primary carrier wave port with the second multiband antenna and connect the secondary carrier wave port with the first multiband antenna; and
   when the signal quality of the first multiband antenna does not meet the preset quality condition and the signal quality of the second multiband antenna does not meet the preset quality, connect the primary carrier wave port with the first multiband antenna and connect the secondary carrier wave port with the second multiband antenna.

10. The terminal according to claim 1, wherein when a signal strength of the first multiband antenna is equal to or greater than a preset threshold, it is determined that the signal quality of the first multiband antenna meets the preset quality condition, and when the signal strength of the first multiband antenna is smaller than the preset threshold, it is determined that the signal quality of the first multiband antenna does not meet the preset quality condition.

* * * * *